United States Patent
Mori et al.

[11] Patent Number: 5,805,253
[45] Date of Patent: Sep. 8, 1998

[54] LIQUID CRYSTAL DISPLAY WITH COMPENSATORS HAVING MINIMUM RETARDATIONS IN THE INCLINED DIRECTION

[75] Inventors: Hiroyuki Mori; Yoji Ito, both of Kanagawa, Japan

[73] Assignee: Fuji Photo Film Co., Ltd., Minami-ashigara, Japan

[21] Appl. No.: 749,894

[22] Filed: Nov. 18, 1996

[30] Foreign Application Priority Data

Nov. 17, 1995 [JP] Japan .................................. 7-299430
Feb. 5, 1996 [JP] Japan .................................. 8-018530

[51] Int. Cl.$^6$ .......................... G02F 1/1335; G02F 1/1337
[52] U.S. Cl. ........................... 349/118; 349/120; 349/177
[58] Field of Search .............................. 349/76, 128, 117, 349/118, 119, 120, 75, 121, 177; 359/494, 500; 428/1

[56] References Cited

U.S. PATENT DOCUMENTS

| | | | |
|---|---|---|---|
| 5,243,451 | 9/1993 | Kanemoto et al. | 349/118 |
| 5,410,422 | 4/1995 | Bos | 349/117 |
| 5,541,753 | 7/1996 | Raynes et al. | 349/117 |
| 5,583,679 | 12/1996 | Ito et al. | 349/118 |
| 5,646,703 | 7/1997 | Kamada et al. | 349/118 |

*Primary Examiner*—William L. Sikes
*Assistant Examiner*—Tai V. Duong
*Attorney, Agent, or Firm*—Burns, Doane, Swecker & Mathis, LLP

[57] ABSTRACT

A liquid crystal display has a bend orientation cell or HAN mode cell and further is provided with an optical compensatory sheet. The optical compensatory sheet shows the minimum of absolute values of retardation values in a direction inclined from the normal of the sheet.

12 Claims, 7 Drawing Sheets

F I G. 7
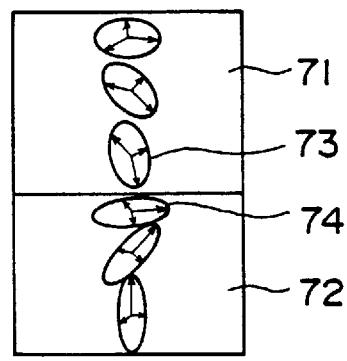
F I G. 8
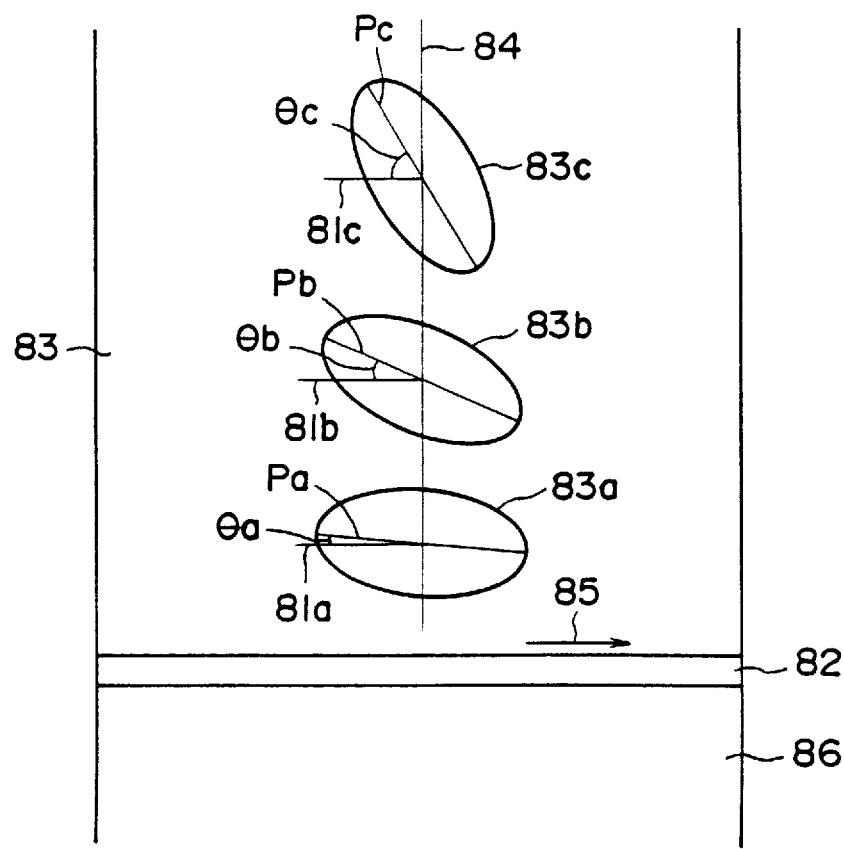

F I G. 10
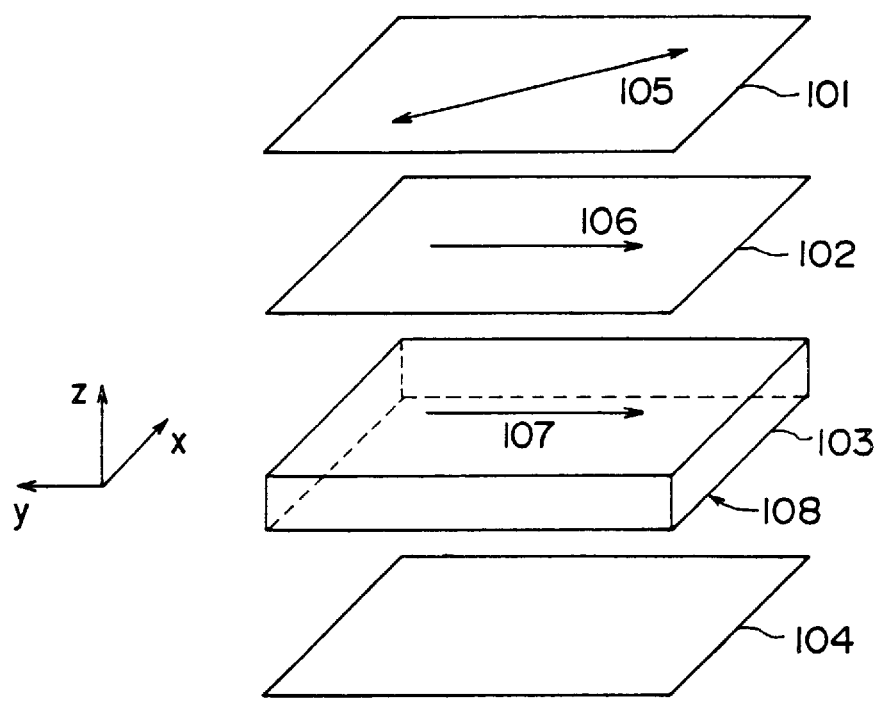

LIQUID CRYSTAL DISPLAY WITH COMPENSATORS HAVING MINIMUM RETARDATIONS IN THE INCLINED DIRECTION

BACKGROUND OF THE INVENTION

1. Field of the Invention

The present invention relates to a liquid crystal display employing a liquid crystal cell capable of forming bend orientation or hybrid alignment.

2. Description of Prior Art

As a display for electronic office system-devices such as a desk-top personal computer and a word processor, CRTs (cathode ray tubes) have been employed so far. Recently, liquid crystal displays (hereinafter referred to as LCDs) are widely employed instead of CRTs because of their small thickness, light weight and low power consumption. LCDs generally have a structure of liquid crystal cell disposed between a pair of polarizing sheets. Most of LCDs use a twisted nematic liquid crystal. Operational modes of LCDs using the twisted nematic liquid crystal is roughly divided into a birefringence mode and an optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such STN-LCD, therefore, has an advantage of giving display of a large volume by driving in time-sharing mode. However, the STN-LCD has disadvantages such as slow response (such as several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In TFT-LCDs and MIM-LCDs, a twisted nematic liquid crystal showing a twisted angle of 90 degrees and having positive birefringence is employed for displaying an image. This is called LCD of an optically rotary mode (i.e., TN-LCD). TN-LCD display mode shows rapid response (such as several tens of milliseconds) and high display contrast, and easily gives a black-white display of high contrast. Hence, the optical rotatory mode has a number of advantages compared with the birefringence mode or other modes. However, TN-LCD has disadvantages that color or contrast on display varies depending upon viewing angle to a liquid crystal display, and its display characteristics are not comparable to display characteristics of CRT.

FIG. 1 is an enlarged cross-sectional view of the liquid crystal cell for the TN-LCD, which has a generally coplanar asymmetrical director field 12 disposed between a pair of substrates having transparent electrodes 14a and 14b. A director (unit vector representing an orientation direction of liquid crystalline molecule) in contact with the substrate is referred to as a surface contacting director 16. Any other director is referred as to a bulk director 13. The degree of birefringence and light transmission at any point in cell 11, is a function of the angle between a light ray and adjacent directors. Minimum birefringence occurs when the light ray propagates parallel to adjacent directors, and the maximum birefringence occurs when the light ray propagates perpendicular to adjacent directors.

For example, a light ray 18 traversing cell 11 at an angle 15 has a minimum effective birefringence because the propagation direction of light ray 18 is somewhat parallel to a majority of directors 13 and 16. However, a light ray 17 traversing cell 11 at an opposite angle 15 has a greater effective birefringence because the propagation direction of light ray 17 is somewhat nonparallel to a majority of directors 13 and 16. Increase of birefringence naturally brings about that of retardation. Thus, variation of color or contrast on display depending upon viewing angle to a liquid crystal display occurs.

In order to improve the viewing angle characteristics (i.e. to enlarge the viewable angle), arrangement of a phase difference film (optical compensatory sheet) between a pair of polarizing plates and TN liquid crystal cell was proposed, and various optical compensatory sheets have been proposed up to now. Arrangement of the optical compensatory sheet enlarges the viewing angle to some extent. However, the enlargement is not sufficiently satisfactory.

Recently, a liquid crystal cell showing inherently an enlarged viewing angle has been proposed (e.g., Japanese Patent Provisional Publication No. 7(1995)-84254, Flat Panel Display (pp. 150–154, 1995) and U.S. Pat. No. 5,410,422). The liquid crystal cell has liquid crystal capable of forming bend orientation therein and is a symmetrical cell.

FIG. 2 shows an enlarged cross-sectional view of the cell, which has optically "self-compensating" director fields 22a and 22b (which constitute a liquid crystal layer) symmetrically disposed about a cell centerline 23 located midway between a parallel pair of substrates having transparent electrode 24a and 24b. The director fields 22a and 22b include surface contacting directors 26a and 26b respectively as well as bulk directors 28a and 28b.

For example, under the conditions that the substrates having transparent electrode 24a and 24b receive applied voltages (electrical potentials) that hold symmetrical director fields 22a and 22b, light ray 27 traversing the cell 21 at angle 29 has a minimum effective birefringence in director field 22a (i.e., which gives the minimum retardation) because the propagation direction of light ray 27 is somewhat parallel to a majority of directors 26a and 28a, and has a greater effective birefringence in director field 22b because the propagation direction of light ray 27 is somewhat nonparallel to a majority of directors 26b and 28b.

For the light ray 27 traversing cell 21 at angle 29, the effective birefringence is decreased in director field 22a but is increased in director field 22b. Thus, as the net effect, a reduced variation of effective birefringence on light ray 27 is given as angle 29 varies.

Similarly, light ray 20 traversing cell 21 at an opposite angle 29 has the same effect as in the light ray 27.

As described above, the liquid crystal cell employing liquid crystal capable of forming bend orientation (thereafter may be referred to as "bend orientation cell") is a symmetrical cell, and therefore shows inherently an enlarged viewing angle. However, the above degree of birefringence is needed to be compensated, and Flat Panel Display (pp. 150–154, 1995) and U.S. Pat. No. 5,410,422 as mentioned above, propose use of negative birefringence compensator plate (thermoplastic polymer film) or diaxial stretched polymer film.

Further, Applied Physical Society, 29a-SZC-20 (42nd, Spring, 1995) has proposed a reflective type liquid crystal display employing HAN mode (Hybrid-aligned-nematic mode) cell which utilizes the upper side of the bend orientation cell (i.e., director field 22a).

FIG. 3 shows an enlarged cross-sectional view of the HAN mode cell. A director field 32 is disposed between a parallel pair of substrates of transparent electrode 33a and 33b. The director field 32 includes surface contacting director 36 and bulk director 38. Light ray 34 traversing the cell 31 at angle 35 has a maximum effective birefringence, and light ray 35 reflected on the substrate 33b (generally reflective plate provided under the substrate) has a lower effective birefringence. The degree of effective birefringences given by light ray 34 and its reflected light ray has the same as in the bend orientation cell.

In the HAN mode reflective LCD, the "Applied Physical Society" describes use of a diaxial stretched film as an optical compensatory sheet.

SUMMERY OF THE INVENTION

The inventors have studied the viewing angle characteristics of the liquid crystal display using the bend orientation cell or HAN mode cell which is provided with a negative birefringence compensator plate or diaxial stretched film as an optical compensatory sheet. As a result, the inventors found that the liquid crystal display provided with the optical compensatory sheet show poor contrast when the display is viewed from greatly oblique direction (especially in up-down direction).

It is a object of the invention to provide a liquid crystal display having bend orientation cell provided with an optical compensatory sheet which has an enlarged viewing angle and is almost free from reversion of black-and-white image or gradation.

It is another object of the invention to provide a liquid crystal display having HAN mode cell provided with an optical compensatory sheet which has an enlarged viewing angle and is almost free from reversion of black-and-white image or gradation.

There is provided by the invention a liquid crystal display comprising a liquid crystal cell which comprises a pair of substrates each of which is provided with a transparent electrode having an orientation layer thereon and a layer of nematic liquid crystal sealed therebetween, a polarizing sheet arranged on each side of the cell, and an optical compensatory sheet provided between at least one side of the liquid crystal cell and the polarizing sheet, the layer of nematic liquid crystal showing bend orientation, the nematic liquid crystal varying its angle of director to the plane of the substrate under variation of voltage applied to the liquid crystal cell;

wherein the optical compensatory sheet shows the minimum of absolute values of retardation values in a direction inclined from the normal of the sheet.

The minimum of absolute values of retardation values is a value other than zero in the invention.

Preferred embodiments of liquid crystal display according to the invention are as follows:

1) The liquid crystal display wherein the optical compensatory sheet comprises a transparent support and an optically anisotropic layer provided thereon, the optically anisotropic layer comprising a compound having one or more discotic structure units in its molecule.

2) The liquid crystal display above 1) wherein the discotic structure units have planes inclined from a plane of the transparent support at angles varying in the direction of depth of the optically anisotropic layer.

3) The liquid crystal display as above 1) wherein the transparent support has an optic axis in the direction of the normal of the support, and satisfies the condition of:

$$20 \leq \{(n_x+n_y)/2-n_z\} \times d_2 \leq 400$$

in which $n_x$ and $n_y$ are main refractive indices within the film, $n_z$ is a main refractive index in the thickness direction of the film, and $d_2$ is the thickness in terms of nm of the support.

4) The liquid crystal display as above 1) wherein the transparent support has an orientation layer thereon.

5) The liquid crystal display which is driven in a normally white mode.

6) The liquid crystal display as above 1) wherein the liquid crystal display has two optical compensatory sheets, and satisfies the condition:

$$0.2 \times Re_2 \leq Re_1 \leq 2.0 \times Re_2$$

wherein $Re_1$ represents an absolute value of a sum of retardation values of the two optical compensatory sheets, and $Re_2$ represents an absolute value of a retardation value of the layer of nematic liquid crystal of the liquid crystal cell;

the retardation value of optical compensatory sheet being defined by the formula:

$$\{(n_2+n_3)/2-n_1\} \times d$$

in which $n_1$, $n_2$ and $n_3$ are refractive indices in the three axis directions of the optical compensatory sheet, $n_1$, $n_2$ and $n_3$ satisfy the condition of $n_1 \leq n_2 \leq n_3$, and d is the thickness in terms of nm of the optical compensatory sheet;

the retardation value of the layer of nematic liquid crystal being defined by the formula:

$$\{n_3-(n_1+n_2)/2\} \times d$$

in which $n_1$, $n_2$ and $n_3$ are refractive indices in the three axis directions of the layer of nematic liquid crystal, $n_1$, $n_2$ and $n_3$ satisfy the condition of $n_1 \leq n_2 \leq n_3$, and d is the thickness in terms of nm of the layer of nematic liquid crystal.

Further, there is provided by the invention a liquid crystal display comprising a liquid crystal cell which comprises a pair of substrates each of which is provided with a transparent electrode having an orientation layer thereon and a layer of nematic liquid crystal sealed therebetween, the orientation layer of one of the substrates being a layer capable of giving homeotropic structure to the nematic liquid crystal, a polarizing sheet arranged on one side of the cell, the other side of the cell being provided with a reflective plate, and an optical compensatory sheet provided between the liquid crystal cell and the polarizing sheet, the layer of nematic liquid crystal showing hybrid alignment, the nematic liquid crystal showing hybrid alignment and varying its angle of director to the plane of the substrate under variation of voltage applied to the liquid crystal cell;

wherein the optical compensatory sheet shows the minimum of absolute values of retardation values in a direction inclined from the normal of the sheet.

Preferred embodiments of the liquid crystal display of the invention are as follows:

1) The liquid crystal display wherein the optical compensatory sheet comprises a transparent support and an optically anisotropic layer provided thereon, the optically anisotropic layer comprising a compound having one or more discotic structure units in its molecule.

2) The liquid crystal display as above 1) wherein the discotic structure units have planes inclined from a plane of the transparent support at angles varying along a direction of depth of the optically anisotropic layer.

3) The liquid crystal display as above 1) wherein the transparent support has an optic axis in the direction of the normal of the support, and satisfies the condition of:

$$20 \leq \{(n_x+n_y)/2 - n_z\} \times d_2 \leq 400$$

in which $n_x$ and $n_y$ are main refractive indices within the film, $n_z$ is a main refractive index in the thickness direction of the film, and $d_2$ is the thickness in terms of nm of the support.

4) The liquid crystal display as above 1) wherein the transparent support has an orientation layer thereon.

5) The liquid crystal display which is driven in a normally white mode.

6) The liquid crystal display as above 1) which satisfies the condition:

$$0.2 \times Re_2 \leq Re_1 \leq 2.0 \times Re_2$$

wherein $Re_1$ represents an absolute value of a retardation value of the optical compensatory sheet, and $Re_2$ represents an absolute value of an retardation value of a layer of the nematic liquid crystal;

the retardation value of optical compensatory sheet being defined by the formula:

$$\{(n_2+n_3)/2 - n_1\} \times d$$

in which $n_1$, $n_2$ and $n_3$ are refractive indices in the three axis directions of the optical compensatory sheet, $n_1$, $n_2$ and $n_3$ satisfy the condition of $n_1 \leq n_2 \leq n_3$, and d is the thickness in terms of the optical compensatory sheet;

the retardation value of the layer of nematic liquid crystal being defined by the formula:

$$\{n_3 - (n_1+n_2)/2\} \times d$$

in which $n_1$, $n_2$ and $n_3$ are refractive indices in the three axis directions of the layer of nematic liquid crystal, $n_1$, $n_2$ and $n_3$ satisfy the condition of $n_1 \leq n_2 \leq n_3$, and d is the thickness in terms of nm of the layer of nematic liquid crystal.

The liquid crystal display using the bend orientation cell or HAN mode cell according to the invention is provided with a specific optical compensatory sheet. The specific optical compensatory sheet is a sheet showing the minimum of absolute values of retardation values in a direction inclined from the normal of the sheet.

The liquid crystal display show excellent contrast even when the display is viewed from greatly oblique direction (especially in up-down direction), and is almost free from reversion of black-and-white image or gradation, and coloring of a displayed image.

BRIEF DESCRIPTION OF THE DRAWINGS

FIG. 7 is a view schematically showing an example of mechanism for compensating the retardation produced by the HAN mode cell.

FIG. 8 is a view schematically showing the representative structure of the optically anisotropic layer of the invention.

FIG. 10 is a view schematically showing the representative structure of the liquid crystal display having HAN mode cell according to the invention.

DETAILED DESCRIPTION OF THE INVENTION

The invention is characterized by the use of the sheet showing the minimum of absolute values of retardation values in a direction inclined from the normal of the sheet as an optical compensatory sheet for the liquid crystal display having the bend orientation cell or HAN mode cell.

As described previously, the liquid crystal cell employing liquid crystal capable of forming bend orientation (bend orientation cell) is a symmetrical cell, and therefore the liquid crystal display having the cell shows inherently an enlarged viewing angle. Similarly, the HAN mode reflective LCD shows inherently an enlarged viewing angle.

A liquid crystal cell generally comprises a pair of substrates each of which is provided with a transparent electrode having an orientation layer thereon and a layer of nematic liquid crystal sealed therebetween. The bend orientation cell generally uses liquid crystal capable of forming bend orientation by application of voltage. The layer of nematic liquid crystal generally shows bend orientation, and the nematic liquid crystal varies its angle of director to the plane of the substrate under variation of voltage applied to the liquid crystal cell. The nematic liquid crystal generally increases its angle of director to the plane of the substrate under increase of voltage applied to the liquid crystal cell.

In the invention, bend orientation of liquid crystal means that the directors of liquid crystalline molecules in the nematic liquid crystal layer (22*a* and 22*b* of FIG. 2) are in symmetry with respect to a centerline (23 of FIG. 2) of the nematic liquid crystal layer, and has at least bend portion in an area relatively adjacent to the substrates. The bend portion means an area where a line formed by the directors is bent.

Figure 1:
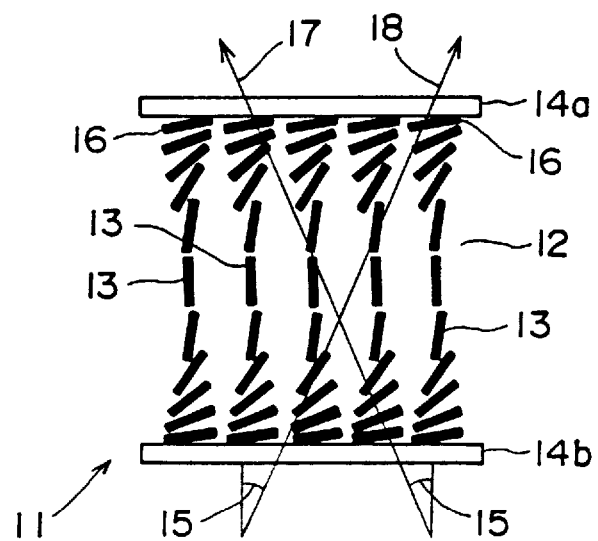
FIG. 1 is an enlarged cross-sectional view of the liquid crystal cell of TN-LCD.
Figure 2:
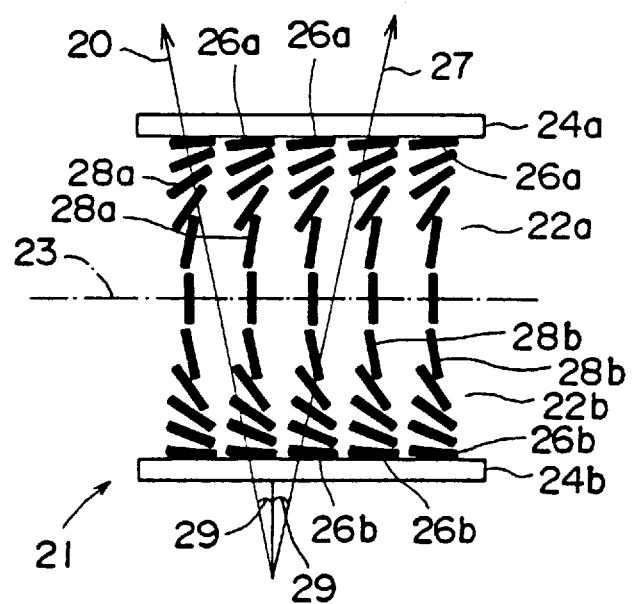
FIG. 2 is an enlarged cross-sectional view of the liquid crystal cell employing liquid crystal capable of forming bend orientation (bend orientation liquid crystal cell).

In more detail, bend orientation of liquid crystal generally means that, as shown in FIG. 2, when voltage is applied to the cell, directors of liquid crystalline molecule in the cell are almost parallel to the lower substrate (24*b* of FIG. 2) in an area in contact with the lower substrate, the directors have an angle between the director and the surface of the substrate which increases with increasing a distance from the substrate, and the directors become perpendicular to the surface of the substrate in an area (centerline area) that distance from the lower substrate is equal to that from the upper substrate, and then the directors have the angle between the director and the surface of the substrate which further increases with increasing a distance from the lower substrate, and finally the directors become almost parallel to the upper substrate (24a of FIG. 2) in an area in contact with the upper substrate. At the centerline area (area in the vicinity of centerline (23 of FIG. 2), the directors may be twisted at about 180 degrees (i.e., may show twisted orientation).

Further, the director in an area adjacent to the lower or upper substrate or in contact with the substrate may be inclined from the surface of the substrate (i.e., may have a tilt angle).

Figure 3:
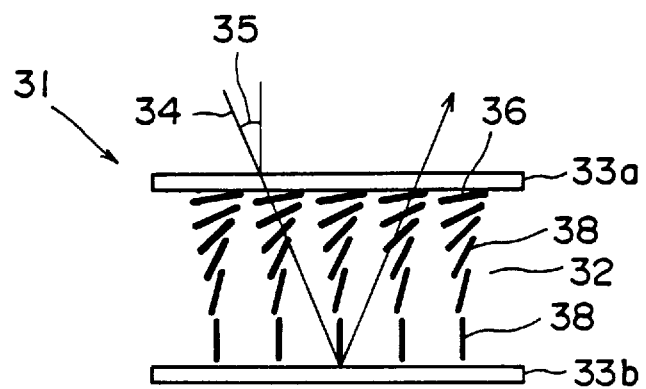
FIG. 3 is an enlarged cross-sectional view of the HAN mode cell.

The nematic liquid crystal used in the HAN mode reflective LCD of the invention is one having property capable of forming hybrid alignment by application of voltage. The HAN mode is well known. The HAN mode cell, as shown FIG. 3, has a structure that a lower substrate is arranged at the location of the centerline in the bend orientation cell. The orientation layer of the lower substrate is a layer capable of giving homeotropic structure to the nematic liquid crystal. Examples of the orientation layer include an inorganic deposited layer, a layer of surfactant and a layer of a silan compound.

Although the liquid crystal display having the bend orientation cell or HAN mode cell has self-compensating director field, light transmittance in a black display portion is increased when the display is viewed from greatly oblique direction (especially in up-down direction) which results in reduction of contrast. By attaching the optical compensatory sheet of the invention to the above cell, not only contrast viewed from oblique direction but also that viewed from front side can be greatly improved.

Figure 4:
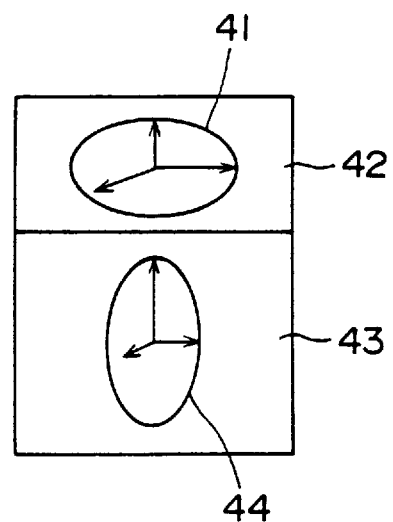
FIG. 4 is a view schematically showing mechanism for compensating the retardation produced by optically positive anisotropy.

If the liquid crystal layer of the cell in which black image is displayed (application of voltage), is considered to be an optical anisotropy having positive mono-axial property, as shown in FIG. 4, an optical anisotropy having negative mono-axial property 41 (e.g., negative birefringence film) can compensate retardation given by the optical anisotropy having positive mono-axial property 44. The reference number 42 is an optical compensatory sheet and the reference number 43 is the liquid crystal layer.

The inventors have found that the optical anisotropy having negative mono-axial property cannot compensate sufficiently the retardation (birefringence) produced by the above cell. Consequently, they have reached the invention that includes an optical compensatory sheet, a sheet showing the minimum of absolute values of retardation values in a direction inclined from the normal of the sheet is employed. The optical compensatory sheet of the invention generally comprises a transparent support and an optically anisotropic layer provided thereon, the optically anisotropic layer comprising a compound having one or more discotic structure units in its molecule. The discotic structure units preferably have a plane inclined from a plane of the transparent support at an angle varying along a direction of depth of the optically anisotropic layer.

Figure 5:
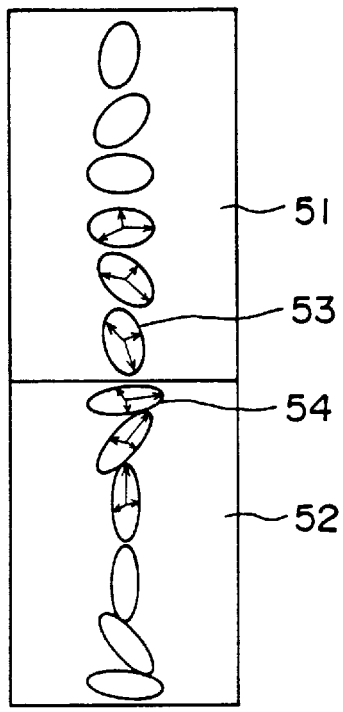
FIG. 5 is a view schematically showing an example of mechanism for compensating the retardation produced by the bend orientation cell.

The principle that the optical compensatory sheet of the invention compensates the retardation of the bend orientation cell or HAN mode cell is explained below referring to FIG. 5, FIG. 6 and FIG. 7.

In more detail, the retardation can be compensated by using an optical anisotropy having alignment (configuration) of directors similar to the alignment in the bend orientation cell or HAN mode cell. FIG. 5 is a view schematically showing an example of mechanism for compensating the retardation produced by the bend orientation cell. A liquid crystalline layer of bend orientation cell 52 comprises an optical anisotropy having positive mono-axial property 54 (e.g., nematic liquid crystalline molecule). An optical compensatory sheet 51 comprises an optical anisotropy having negative mono-axial property 53 (e.g., discotic liquid crystalline molecule). In the optical compensatory sheet 51, the optic axis (director) optical anisotropy having negative mono-axial property 53 has a large angle inclined from the normal in an area adjacent to the liquid crystalline layer of bend orientation cell 52, has an angle of almost 0 degree in a central area of the sheet in the thickness direction, and has the angle which increases with increase of distance from the liquid crystalline layer. The optical compensatory sheet 51 is generally prepared by coating a coating liquid containing a compound having discotic structure unit (e.g., discotic liquid crystalline compound) on an orientation layer provided on a transparent support, heating the compound to orient and cooling to form an anisotropic layer. The optical compensatory sheet 51 may be composed of one anisotropic layer or two anisotropic layers (e.g., layers 61, 63 as described below). Instead of the discotic compound, cholesteric liquid crystalline compound, chiral nematic liquid crystalline compound may be employed. Further, liquid crystalline polymers such as polymers having discotic structure unit and polymers showing cholesteric phase may be employed.

Figure 6:
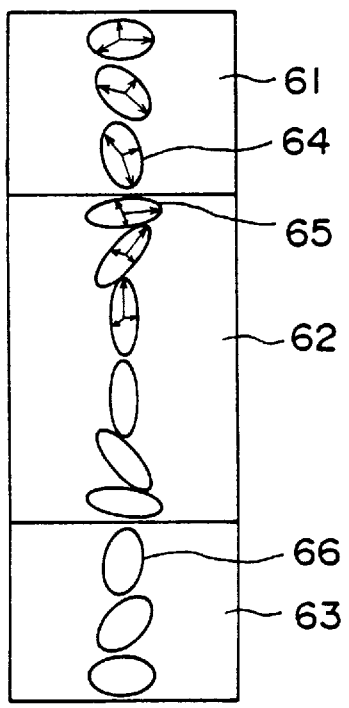
FIG. 6 is a view schematically showing another example of mechanism for compensating the retardation produced by the bend orientation cell.

FIG. 6 is a view schematically showing another example of mechanism for compensating the retardation produced by the bend orientation cell (i.e., in the case of using two optical compensatory sheets). A liquid crystalline layer of bend orientation cell 62 comprises an optical anisotropy having positive mono-axial property 65 (e.g., nematic liquid crystalline molecule). An optical compensatory sheet 61 comprises an optical anisotropy having negative mono-axial property 64 (e.g., discotic liquid crystalline molecule) and an optical compensatory sheet 63 comprises an optical anisotropy having negative mono-axial property 66. In the optical compensatory sheets 61 and 63, the optic axis of the optical anisotropy having negative mono-axial property 64 or 66 has a large angle inclined from the normal in an area adjacent to the liquid crystalline layer 62, and has the angle which reduces with increase of distance from the liquid crystalline layer. The optical compensatory sheets 61 and 63 can be employed by superposing them on one side of the cell.

FIG. 7 is a view schematically showing an example of mechanism for compensating the retardation produced by the HAN mode cell. A liquid crystalline layer of HAN mode cell 72 comprises an optical anisotropy having positive mono-axial property 74 (e.g., nematic liquid crystalline molecule). An optical compensatory sheet 71 comprises an optical anisotropy having negative mono-axial property 73 (e.g., discotic liquid crystalline molecule). In the optical compensatory sheet 71, the optic axis of the optical anisotropy having negative mono-axial property 73 has a large angle inclined from the normal in an area adjacent to the liquid crystalline layer 72, and has the angle which reduces with increase of distance from the liquid crystalline layer. The HAN mode cell generally uses liquid crystal capable of forming hybrid alignment by application of voltage. The layer of nematic liquid crystal generally shows hybrid alignment, and the nematic liquid crystal varies its angle of director to the plane of the substrate under variation of voltage applied to the liquid crystal cell. The nematic liquid crystal generally increases its angle of director to the plane of the substrate under increase of voltage applied to the liquid crystal cell.

In the liquid crystal display using the bend orientation cell, an absolute value of a sum of retardation values of the optical compensatory sheets ($Re_1$) and an absolute value of an retardation value of a layer of the nematic liquid crystal ($Re_2$), generally satisfy the condition:

$$0.2 \times Re_2 \leq Re_1 \leq 2.0 \times Re_2$$

preferably satisfy the condition:

$$0.2 \times Re_2 \leq Re_1 \leq 1.5 \times Re_2$$

especially satisfy the condition:

$$0.4 \times Re_2 \leq Re_1 \leq 1.0 \times Re_2.$$

the retardation value of optical compensatory sheet being defined by the formula:

$$\{(n_2+n_3)/2-n_1\} \times d$$

in which $n_1$, $n_2$ and $n_3$ are refractive indices in the three axis directions of the optical compensatory sheet, $n_1$, $n_2$ and $n_3$ satisfy the condition of $n_1 \leq n_2 \leq n_3$, and d is the thickness in terms of nm of the optical compensatory sheet;

the retardation value being defined by the formula:

$$\{n_3-(n_1+n_2)/2\} \times d$$

in which $n_1$, $n_2$ and $n_3$ are refractive indices in the three axis directions of the layer of nematic liquid crystal, $n_1$, $n_2$ and $n_3$ satisfy the condition of $n_1 \leq n_2 \leq n_3$, and d is the thickness in terms of nm of the layer of nematic liquid crystal.

Also, in the case that the optically anisotropic layer is one layer, the above condition should be satisfied.

In the liquid crystal display having the HAN mode cell, an absolute value of a retardation value of the optically anisotropic layer ($Re_1$) and an absolute value of a retardation value of the layer of nematic liquid crystal of the liquid crystal cell ($Re_2$) satisfies the condition:

$$0.2 \times Re_2 \leq Re_1 \leq 2.0 \times Re_2$$

preferably satisfies the condition:

$$0.2 \times Re_2 \leq Re_1 \leq 1.5 \times Re_2$$

especially satisfies the condition:

$$0.4 \times Re_2 \leq Re_1 \leq 1.0 \times Re_2.$$

The retardation value of optical compensatory sheet is defined by the formula:

$$\{(n_2+n_3)/2-n_1\} \times d$$

in which $n_1$, $n_2$ and $n_3$ are refractive indices in the three axis directions of the optical compensatory sheet, $n_1$, $n_2$ and $n_3$ satisfy the condition of $n_1 \leq n_2 \leq n_3$, and d is the thickness in terms of nm of the optical compensatory sheet; and the retardation value of the layer of nematic liquid crystal is defined by the formula:

$$\{n_3-(n_1+n_2)/2\} \times d$$

in which $n_1$, $n_2$ and $n_3$ are refractive indices in the three axis directions of the layer of nematic liquid crystal, $n_1$, $n_2$ and $n_3$ satisfy the condition of $n_1 \leq n_2 \leq n_3$, and d is the thickness in terms of nm of the layer of nematic liquid crystal.

$|\Delta n_3 \times d_3|$ which is described later, also has the meanings of the above formula ($\{(n_2+n_3)/2-n_1\} \times d$). $|\Delta n_1 \times d_1|$ which is described later, also have the meanings of the above formula ($\{n_3-(n_1+n_2)/2\} \times d$).

The liquid crystal display can be driven in a normally white mode or a normally black mode. The normally white mod is preferred because normally black mode is apt to give variation of color with increase of viewing angle.

The optical compensatory sheet used for the liquid crystal display of the invention generally comprises an optically anisotropic layer which comprises a compound having a discotic structure unit in its molecule. Examples of the compound includes a discotic liquid crystalline compound having low molecular weight such as monomer and a polymer obtained by polymerization of a polymerizable discotic liquid crystalline compound. The optical compensatory sheet preferably comprises a transparent support and an optically anisotropic layer provided thereon. Further, an orientation layer is preferably provided between the transparent support and the optically anisotropic layer.

As material of the transparent support of the invention, any material can be employed, so long as it is transparent. The material preferably has a transmittance of not less than 80% and specially shows optical isotropy when it is viewed from a front side.

Such material is available on market by the trade name of Geonex (from Nippon Geon Co., Ltd.), Arton (from Japan Synthetic Rubber Co., Ltd.) and Fuji TAC (from Fuji Photo Film Co., Ltd.). Moreover, materials having a large intrinsic birefringence such as polycarbonate, polyarylate, polysulfone and polyethersulfone can be also employed by rendering the materials optically isotropic by appropriately controlling molecular orientation in the procedure of forming a film.

The transparent support generally an optic axis in the direction of the normal of the support, and satisfies the condition of:

$$20 \leq \{(n_x+n_y)/2-n_z\} \times d_2 \leq 1000$$

in which $n_x$ and $n_y$ are main refractive indices within the film, $n_z$ is a main refractive index in the thickness direction of the film, and $d_2$ is the thickness in terms of nm of the support, preferably satisfies the condition of:

$$20 \leq \{(n_x+n_y)/2-n_z\} \times d_2 \leq 400 \text{ (nm)}$$

especially satisfies the condition of:

$$50 \leq [(n_x+n_y)/2-n_z] \times d_2 \leq 400$$

Further, "$|n_x-n_y| \times d_2$" of retardation from front side (when the display is viewed from the front side) generally is in the range of 0 to 200 nm, preferably is in the range of 0 to 150 nm, especially is in the range of 0 to 100 nm.

The transparent support generally has the following wavelength dispersion α of not less than 1.0, preferably in the range of 1.0 to 1.3.

$$\alpha = \Delta n_2(450 \text{ nm})/\Delta n_2(600 \text{ nm})$$

in which $\Delta n_2$(450 nm) is birefringence of the support to light having wavelength of 450 nm, $\Delta n_2$(600 nm) is birefringence of the support to light having wavelength of 600 nm The support having the wavelength dispersion can be prepared by using the above materials having a large intrinsic birefringence.

A subbing layer is preferably formed on the transparent support to increase bonding strength between the transparent support and the orientation layer.

The formation of the subbing layer is generally formed on the transparent support by a coating method after providing a surface activation treatment such as a chemical treatment, a mechanical treatment, a corona discharge treatment, a flame treatment, a UV treatment, a high frequency wave treatment, a glow discharge treatment, an active plasma treatment, and an ozone oxidation treatment (preferably a glow discharge treatment).

The subbing layer may comprise a first subbing layer highly bonding to the support and a second subbing layer (hydrophilic resin layer) highly bonding to the orientation layer (double-layer process) which preferably comprises gelatin, or is composed of only one layer comprising resin such as gelatin having both of a hydrophilic group and a hydrophobic group (single-layer process).

The orientation layer is generally provided on the transparent support or the above subbing layer. The orientation layer has a function of defining an orientation direction of a discotic liquid crystalline compound to be provided thereon by a coating method, and the orientation gives the direction of minimum Re inclined from an optical compensatory sheet. As the orientation layer, any layers can be employed so long as they are capable of imparting orientation property to an optically anisotropic layer (layer of discotic compound). Preferred examples of the orientation layer include a layer of an organic compound (preferably polymer) subjected to rubbing treatment, an obliquely deposited layer of an inorganic compound, and a layer having micro grooves. Further, a built-up film formed according to Langmuir-Blodgett technique (LB technique) from ω-tricosanoic acid, dioctadecyldimethylammoniumchloride, methyl stearate or an azobenzene derivative, that is isomerized by means of light to form a thin film of the molecules tilted uniformly in a certain direction, can be used as the orientation layer. In addition, a layer prepared by orienting dielectric materials by application of electric field or magnetic field can be employed as the orientation layer.

Examples of material for the orientation layer include polymers such as polymethyl metacrylate, acrylic acid/methacrylic acid copolymer, styrene/maleinimide copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, and polycarbonate; and organic substances such as silan coupling agents.

Preferred examples of polymers for the orientation layer include polyimide, polystyrene, polymer of styrene derivatives, gelatin, polyvinyl alcohol and polyvinyl alcohol having an alkyl group (preferably having 6 or more carbon atoms). The polyvinyl alcohol having an alkyl group is especially preferred from the viewpoint of uniform orientation of the discotic liquid crystal. It is presumed that interaction between the alkyl chain on the orientation layer and the discotic liquid crystal gives high orientation. The alkyl group of the polyvinyl alcohol is preferably present as a side or terminal group of the polyvinyl alcohol, and especially as a terminal group. The alkyl group preferably has 6–14 carbon atoms, and the alkyl group is preferably attached to the polyvinyl alcohol through —S—, —($CH_3$)C(CN)— or —($C_2H_5$)N—CS—S—. The polyvinyl alcohol preferably has a saponification value of not less than 80% and a degree of polymerization of not less than 200. The polyvinyl alcohol having an alkyl group is available as trade names of MP103, MP203 and R1130 (produced by Kuraray Co., Ltd.)

A polyimide film (preferably fluorine-containing polyimide film), which is widely used as an orientation layer for a liquid crystal cell, is also preferably employed as the orientation layer of the invention. The polyimide film can be prepared by coating a solution of polyamic (polyamide) acid (e.g., a series of LQ/LX available from Hitachi Chemical Co., Ltd.; and a series of SE available from Nissan Chemical Industries, Ltd.) on the transparent support, dried at 100° to 300° C. for 0.5 to 1 hour, and rubbing a surface of the resultant polyimide film.

The orientation layer for the discotic liquid crystalline compound can be rubbed in the known manner which is conventionally employed to prepare an orientation layer or surface for liquid crystal of LCD. In more detail, the treatment is performed to give a function of orienting a liquid crystal to a surface of the orientation layer by rubbing the surface in a certain direction by the use of paper, gauze, felt, rubber, or fiber of polyamide or polyester. The rubbing procedure is generally performed by rubbing a surface of the orientation layer in several times using cloth.

As the orientation layer, an obliquely deposited layer of an inorganic compound is also employable. Examples of the inorganic compounds include metal oxides or metal fluorides such as $SiO$, $TiO_2$, $MgF_2$ and $ZnO_2$ and metals such as Au and Al. As the inorganic compounds, any compounds can be employed, so long as they have high dielectric constant (permittivity). The obliquely deposited layer of an inorganic compound can be prepared using the metallizing apparatus. The support may be metallized in the fixed condition, or the continuous support may be continuously metallized to give a continuous layer.

Other methods for orienting an optically anisotropic layer (layer of discotic liquid crystalline compound) with no using the orientation layer, include those applying magnetic field or electric field to the layer provided on a support at desired angle under heating for forming discotic nematic phase.

The optically anisotropic layer is generally formed on the orientation layer. The optically anisotropic layer of the invention generally comprises a compound having a discotic structure unit in its molecule. In more detail, the layer generally comprises a discotic liquid crystalline compound or a polymer that a polymerizable discotic liquid crystalline compound is polymerized (cured). The optically anisotropic layer preferably comprises the polymer.

The discotic liquid crystalline compound is characterized in that a discotic structure is located at a center of the compound as a parent core and further straight chain groups such as alkyl, alkoxy and benzoyl having a substituent are radially bonded to the compound. The feature of the parent core other than the straight chain groups (i.e., discotic compound having no substituent) can be given in the following manner.

The molecular size of the parent core is determined as follows:

1) A planner molecular structure suitable for the molecule (parent core) is designed by determining the bond distances and the bond angles (in which the standard values according to hybridization of the orbitals are employed) referring to, for example, "A Handbook of Chemistry, fourth edition, basic series, II volume, 15 chapter, edited by The Chemical Society of Japan, 1993".

2) The resultant planner molecular structure is appropriately modified by utilizing a method of molecular orbital method and a method of molecular mechanics (which are described in Gaussian 92, MOPAC 93, CHARAm/QUANTA and NM3, preferably Gaussian 92), to give an optimum structure.

3) To each of atoms constituting the molecule having the optimum structure, sphere defined by van der Waals radius is given, to picture the molecular structure.

4) A minimum rectangular parallelepiped into which the molecular structure obtained in above 3) can be incorporated is determined. The rectangular parallelepiped has three edges a, b and c.

The above procedures 3) and 4) are preferably conducted in the following manner.

3') The center of gravity of molecule having the optimum structure is placed on the origin of coordinate axes including a main axis of inertia (main axis of inertia ellipse body).

4') To each of atoms constituting the molecule having the optimum structure, sphere defined by van der Waals radius is given, to picture the molecular structure.

5) On the surfaces of the spheres defined by van der Waals radius, length in the each direction of the coordinate axes is measured. The three lengths represent a, b and c.

The molecular structure of the parent core of the discotic liquid crystalline compound can be represented, by using the above a, b and c, as a structure satisfying the conditions of a≧b>c and a≧b≧a/2, preferably the conditions of a≧b>c and a≧b≧0.7a. Further, the structure preferably satisfies the condition of b/2>c.

Examples of the discotic liquid crystalline compound employed in the invention include the following compounds:

Examples of the compounds include benzene derivatives described in C. Destrade et al., Mol. Cryst. vol. 71, pp. 111, 1981, truxene derivatives described in C. Destrade et al., Mol Cryst. vol. 122, pp. 141. 1985, Physics lett. A, vol. 78, pp. 82, 1980, cyclohexane derivatives described in B. Kohn et al., Angew. Chem. vol. 96, pp. 70, 1984, macrocyclic compounds of azacrown-type or phenylacetylene-type described in J. M. Lehn et al., J. Chem. Commun. pp. 1794, 1985, and J. Zhang et al., J. Am. Chem. Soc. vol. 116, pp.2655, 1994. The discotic liquid crystal generally has a structure that the above compound is located at a center of the crystal as a parent core and further straight chain groups such as alkyl, alkoxy and benzoyl having a substituent are radially bonded to the compound. As the discotic liquid crystals, any discotic liquid crystals can be used, so long as the liquid crystals have a negative birefringence (negative uniaxial property) and orientation property.

Preferred examples of the discotic liquid crystalline compounds employable in the invention are described below.

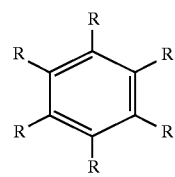

TE-1

R: n-C₁₁H₂₃—C—O—,

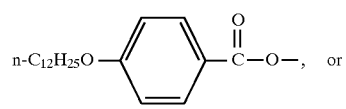

or

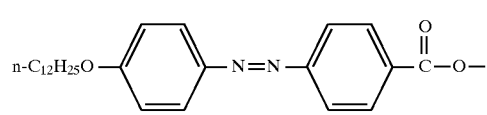

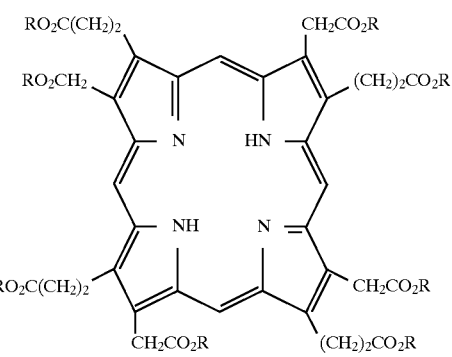

TE-2

R: n-C₁₂H₂₅—

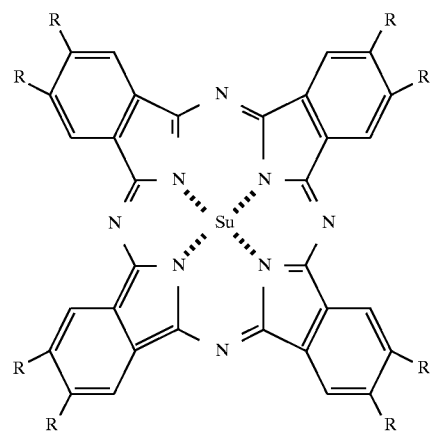

TE-3

R: n-C₁₂H₂₅OCH₂—

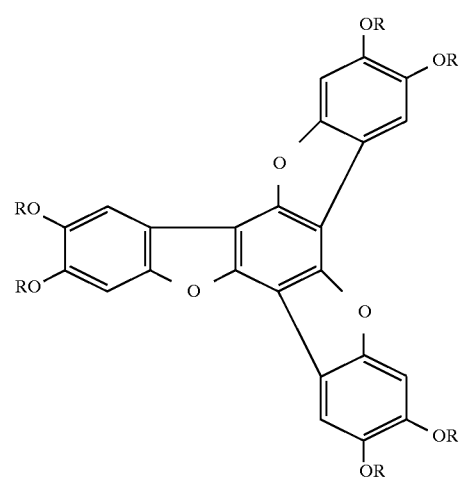

TE-4

R: n-C₁₂H₂₅O—⌬—C— or n-C₁₃H₂₇CO—

-continued

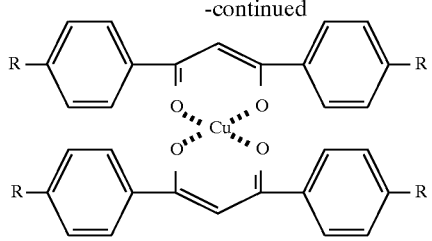

R: n-C$_{10}$H$_{21}$—

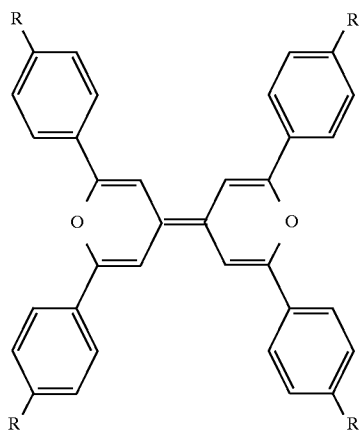

R: n-C$_8$H$_{17}$—

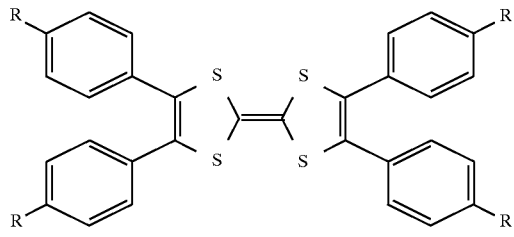

R: n-C$_{16}$H$_{33}$O—

TE-8

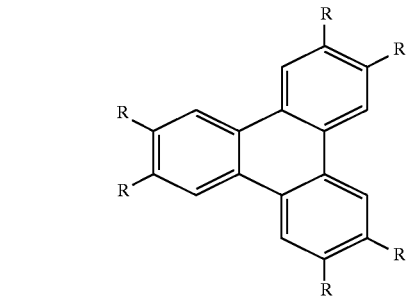

R: (1) n-C$_m$H$_{2m+1}$O— (m = an integer of 2–15), (2) n-C$_8$H$_{17}$—C(=O)—O—, (3) n-C$_8$H$_{17}$O—C$_6$H$_4$—C(=O)—O—, TE-5 (4) n-C$_7$H$_{15}$O—C$_6$H$_4$—C(=O)—O—, (5) n-C$_5$H$_{11}$O—C$_6$H$_4$(meta)—C(=O)—O—, TE-6 (6) n-C$_m$H$_{2m+1}$O—C$_6$H$_4$—CH=CH—C(=O)—O—

(m = an integer of 7–10), (7) CH$_2$(epoxide)CH—C$_m$H$_{2m}$—O—C$_6$H$_4$—C(=O)—O—

(m = an integer of 4–10), or (8) CH$_2$=CH—C(=O)—O—C$_m$H$_{2m}$—O—C$_6$H$_4$—C(=O)—O—

(m = an integer of 4–10)

TE-7

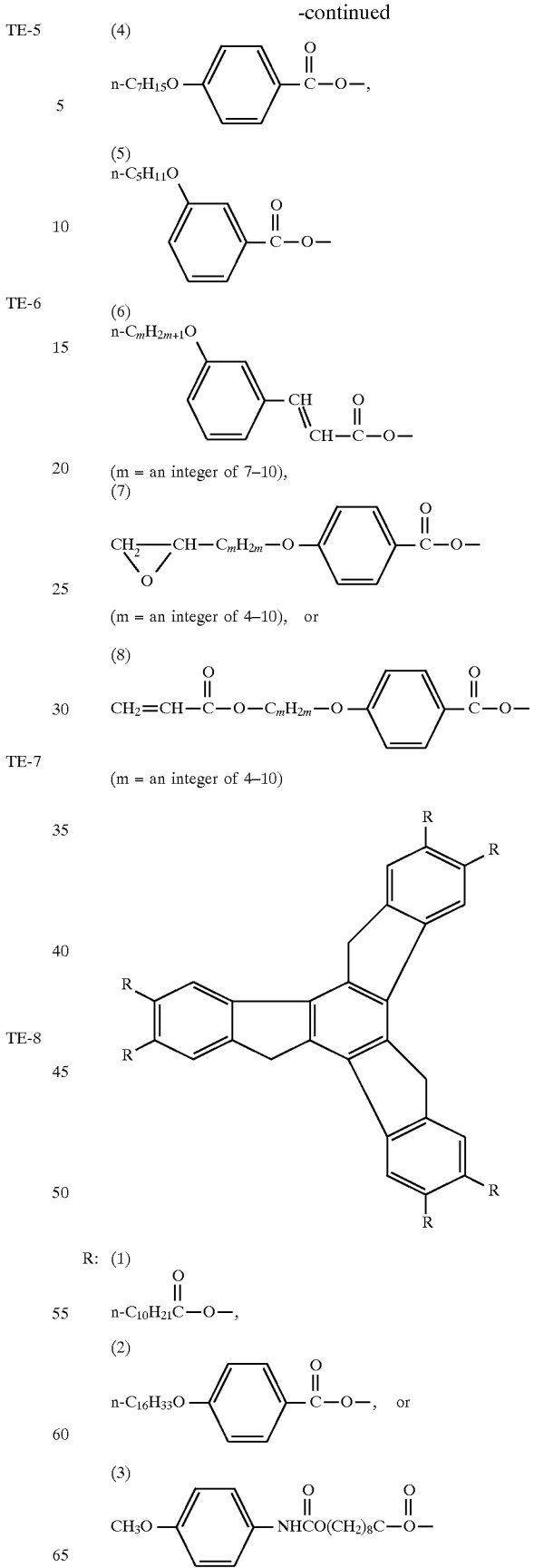

TE-9

R: (1) n-C$_{10}$H$_{21}$C(=O)—O—, (2) n-C$_{16}$H$_{33}$O—C$_6$H$_4$—C(=O)—O—, or (3) CH$_3$O—C$_6$H$_4$—NHCO(CH$_2$)$_8$C(=O)—O—

-continued

TE-10

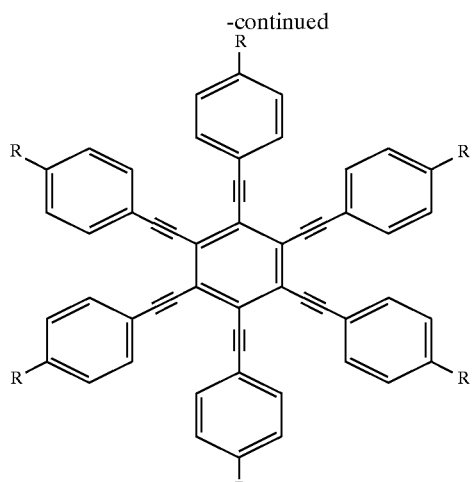

R: C$_7$H$_{15}$O—

TE-11

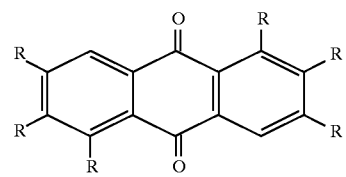

R: (1)
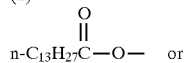
or (2)
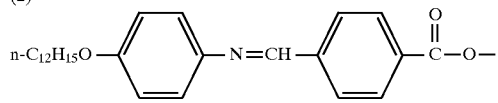

The optical compensatory sheet is preferably prepared by forming an orientation layer on a transparent support and forming an optically anisotropic layer on the orientation layer, as mentioned above.

The optically anisotropic layer is preferably formed of a compound having one or more discotic structure units, and the discotic structure units have planes inclined from a plane of the transparent support at an angle varying in (along) the direction of depth of the optically anisotropic layer. The discotic structure units are originated from the discotic liquid crystalline compound or polymer thereof.

The above angle (inclined angle) of the plane of discotic structure unit generally increases or decreases with increase of distance in the direction of depth from the bottom of the optically anisotropic layer. The inclined angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area that the inclined angle does not vary in the course of the thickness direction of the layer. The inclined angle preferably totally increases or decreases in the layer, even if it does not vary in the course. The inclined angle more preferably increases totally, and especially continuously increases.

The section view of the representative optically anisotropic layer of the invention is schematically shown in FIG. 8.

The optically anisotropic layer 83 is provided on the orientation layer 82 which is formed on the transparent support 86. The discotic liquid crystalline compounds 83a, 83b and 83c constituting the optically anisotropic layer 83 are arranged on the orientation layer 82 in such a manner that the planes of discotic structure units Pa, Pb and Pc, are inclined from planes 81a, 81b and 81c which are parallel to a plane of the transparent support 86 and the inclined angles θa, θb and θc (angle between the plane of discotic structure unit and the plane of transparent support) increase, in order, with increase of distance in a direction of depth (thickness) from a bottom of the optically anisotropic layer. The reference number 84 is the normal of the transparent support. The reference number 85 is an arrow which shows the direction obtained when the direction showing the minimum of absolute values of retardation values of the optically anisotropic layer is projected on the transparent support.

The discotic liquid crystalline compound is a planar molecule, and therefore has only one plane (e.g., 81a, 81b, 81c) in the molecule. However, in the case that the discotic liquid crystalline compound is polymerized, the resultant polymer has plural planes in the molecule.

The inclined angle varies within the range of 5 to 85 degree (preferably 10 to 80 degrees). The minimum of the inclined angle is in the range of 0 to 85 degrees (preferably 5 to 40 degrees) and the maximum of the inclined angle is in the range of an angle of 5 to 90 degree (preferably 30 to 85 degrees). In FIG. 8, the inclined angle of the plane of discotic unit (e.g., θa) on the support side approximately corresponds to the minimum, and the inclined angle (e.g., θc) approximately corresponds to the maximum. Further, the difference of the minimum (e.g., the inclined angle of the discotic unit on the support side) and the maximum (e.g., the inclined angle on a surface side) preferably is in the range of 5 to 70 degrees (especially 10 to 60 degrees).

The optically anisotropic layer can be generally prepared by coating a solution of the discotic compound and other compound in a solvent on the orientation layer, dried, heating to temperature for forming a discotic nematic phase and cooling with keeping the oriented condition (discotic nematic phase). Otherwise, the layer can be prepared by coating a solution of a polymerizable discotic compound and other compound in a solvent on the orientation layer, dried, heating to temperature for forming a discotic nematic phase, polymerizing the heated layer (e.g., by radiation of UV light) and cooling. The transition temperature from discotic nematic phase to solid phase (temperature for heating) preferably is in the range of 70° to 300° C., especially 70° to 170° C.

For example, the inclined angle of the discotic unit on the support side can be generally controlled by selection of discotic compounds or materials of the orientation layer, or selection of methods for rubbing treatment. The inclined angle of the discotic unit on a surface side (air side) can be controlled by selection of discotic compounds or other compounds (e.g., plasticizer, surface active agent, polymerizable monomer and polymer) employed together with the discotic liquid crystalline compound. Further, the extent of variation of the inclined angle can be also controlled by the above selection.

As the plasticizer, surface active agent or polymerizable monomer, any compounds can be employed so long as they are compatible with the discotic compound and have properties of giving variation of the inclined angle of the discotic liquid crystalline compound or not inhibiting orientation of the discotic liquid crystalline compound. Preferred is polymerizable monomer (e.g., compounds having a vinyl, vinyloxy, acryloyl or methacryloyl group). The compound are preferably used in the amount of 1 to 50 weight % (especially 5 to 30 weight %) based on the amount of the discotic compound.

As examples of polymer, any polymers can be employed, so long as they are compatible with the discotic compound and are capable of giving variation of the inclined angle of the discotic liquid crystalline compound. Preferred are cellulose esters. Examples of the cellulose esters include acetylcellulose, acetylpropionylcellulose, hydroxypropylcellulose, and acetylbutyrylcellulose. Preferred is acetylbutyrylcellulose. The polymer are generally used in the amount of 0.1 to 10 weight % (preferably 0.1 to 8.0 weight % and especially 0.1 to 5.0 weight %) based on the amount of the discotic compound, so as not to inhibit orientation of the discotic liquid crystalline compound.

The acetylbutyrylcellulose preferably has butyryl value of not less than 30% (especially 30 to 80%). The acetylbutyrylcellulose preferably has acetyl value of not less than 30% (especially 30 to 80%). The acetylbutyrylcellulose preferably has viscosity of 0.01 to 20 second which is obtained by measurement according to ASTM D-817-72.

A liquid crystal display provided with the optically anisotropic layer (optical compensatory sheet) having the varying inclined angle indicated in FIG. 8 has greatly enlarged viewing angle, and almost free from reversion of black-and-white image or gradation and coloring of a displayed image.

Generally, the above optically anisotropic layer should have a haze of not more than 5.0, and therefore the optical compensatory sheet also has haze of not more than 5.0 because the transparent support generally has low haze. When a liquid crystal display provided with a sheet having high haze displays black image, an incident light comes partially through a black-displayed portion and therefore the light is not sufficiently cut off to give lowering of contrast in the black-displayed portion. The degree of the cutoff is further reduced when a light is incident in the direction of the normal of the sheet or near to the normal, so that the contrast is also lowered greatly in this case. Hence, the haze of the optical compensatory sheet (i.e., the optically anisotropic layer) preferably has a value of not more than 5.0%, preferably not more than 3.0% and especially not more than 1.0%.

The solution for forming the optically anisotropic layer is prepared by dissolving the discotic compound(s) and other compounds described previously in a solvent.

Examples of solvents employable for dissolving the compound therein, include polar solvents such as N,N-dimethylformamide (DMF), dimethyl sulfoxide (DMSO) and pyridine, nonpolar solvents such as benzene and hexane, alkyl halides such as chloroform and dichloromethane, esters such as methyl acetate and butyl acetate, ketones such as acetone and methyl ethyl ketone, and ethers such tetrahydrofuran and 1,2-dimethoxyethane. Preferred are alkyl halides and ketones. The solvents may be employed singly or in combination.

Examples of the method for coating the above solution thereof includes curtain coating method, extrusion coating method, roll coating method, dip coating method, spin coating method, print coating method, coating method using slide coater and spray coating method. In the invention, vapor deposition method may be used, in the case of a mixture of only discotic compounds. In the invention, a continuously coating method is preferred. Therefore, coating methods such as curtain coating method, extrusion coating method, roll coating method and coating method using slide coater are preferred.

As mentioned above, the optical compensatory sheet can be prepared by coating the coating solution on the orientation layer, heating the coated solution to a temperature of not less than glass transition temperature (further curing the layer by irradiation of UV light, if desired), and cooling the layer to room temperature.

The optical compensatory sheet shows the minimum of absolute values of retardation values in a direction inclined from the normal of the sheet. The optically anisotropic layer preferably shows the minimum of absolute values of retardation values in the direction. The direction showing the minimum is generally inclined at an angle of 5 to 80 degrees from the normal, preferably at an angle of 10 to 70 degrees, especially at an angle of 20 to 60 degrees. Further, Re (retardation) of the optically anisotropic layer which is represented by $|\Delta n_3 \times d_3|$ ($\Delta n_3$ is birefringence of optically anisotropic layer, $d_3$ is a thickness (nm)) generally is in the range of 50 to 1000 nm, preferably 50 to 800 nm, especially 100 to 500 nm.

Figure 9:
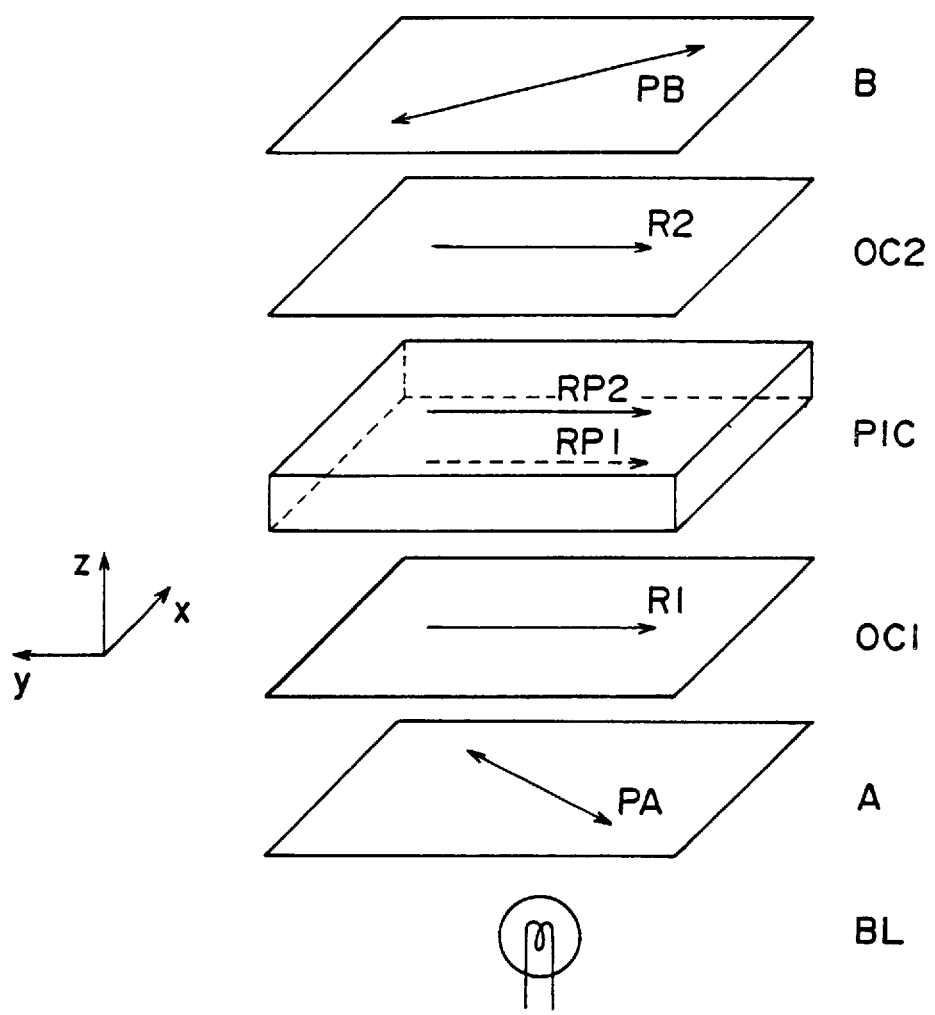
FIG. 9 is a view schematically showing the representative structure of the liquid crystal display having bend orientation cell according to the invention.

The representative structure of the liquid crystal display having a bend orientation cell of the invention is shown in FIG. 9. In FIG. 9, a liquid crystal cell PIC comprising a pair of substrates provided with a transparent electrode having an orientation layer thereon and a nematic liquid crystal sealed therebetween, a pair of polarizing plates A and B arranged on the both sides of the cell, the optical compensatory sheets OC1 and OC2 between the liquid crystal cell and the polarizing sheet and back light BL are assembled to constitute the liquid crystal display. The optical compensatory sheet may be arranged only on one side (i.e., use of one of OC1 and OC2). The reference numbers R1 and R2 each are arrow showing rubbing direction and the arrows correspond to the direction of the arrow 85 of FIG. 8. The optically anisotropic layers of the optical compensatory sheets OC1 and OC2 are faced to the liquid crystal cell. The optically anisotropic layers, however, may be faced to the polarizing sheets, and in this case, the directions of arrow R1 and R2 are opposite to the above direction. An arrow RP2 of a solid line of the liquid crystal cell PIC indicates the rubbing direction of the polarizing sheet B side substrate of PIC, and an arrow RP1 of a dotted line of the liquid crystal cell PIC indicates the rubbing direction of the polarizing sheet A side substrate of PIC. PA and PB are transmission axes of polarizing sheets A and B, respectively.

The optically anisotropic layers of the optical compensatory sheets OC1 and OC2 are preferably faced to the liquid crystal cell as mentioned above. In this case, an angle between the arrows R1 and RP1 is generally in the range of −45 to 45 degrees, preferably in the range of −20 to 20 degrees, especially in the range of −10 to 10 degrees. An angle between the arrows R2 and RP2 also is generally in the same range as above. It is preferred that the optical compensatory sheets are provided on each side of the cell. The transmission axes PA and PB are preferably perpendicular or parallel each other, and its allowable range is generally not more than 10 degrees. An angle between the arrow RP1 and the transmission axis PA generally is in the rage of 10 to 80 degrees, preferably in the range of 20 to 70 degrees, especially in the range of 35 to 55 degrees.

The representative structure of the liquid crystal display having a HAN mode cell of the invention is shown in FIG. 10. In FIG. 10, a liquid crystal cell 103 comprising a pair of substrates provided with a transparent electrode having and a nematic liquid crystal sealed therebetween, a polarizing plate 101 arranged on one side of the cell, the optical compensatory sheet 102 between the liquid crystal cell and the polarizing sheet and a reflective plate 104 are assembled to constitute the liquid crystal display. The orientation layer of one of the substrates is a layer capable of giving homeotropic structure to the nematic liquid crystal, which enables hybrid alignment of nematic liquid crystal. A diffusion plate may be provided on the cell. The reference number 106 is an arrow showing rubbing direction and the arrows correspond to the direction of the arrow 85 of FIG. 8. An arrow 107 of a solid line of the liquid crystal cell 103 indicates the rubbing direction of the upper side substrate of the liquid crystal cell, and the reference number 108 is a perpendicular orientation layer.

The optically anisotropic layer of the optical compensatory sheet 102 is preferably faced to the liquid crystal cell. In this case, an angle between the arrows 106 and 107 is generally in the range of −45 to 45 degrees, preferably in the range of −20 to 20 degrees, especially in the range of −10 to 10 degrees. An angle between the arrow 107 and the transmission axis 105 generally is in the rage of 10 to 80 degrees, preferably in the range of 20 to 70 degrees, especially in the range of 35 to 55 degrees.

Further, Re (retardation) of the liquid crystalline layer which is represented by $|\Delta n_1 \times d_1|$ ($\Delta n_1$ is birefringence of liquid crystal of the cell, $d_1$ is a thickness (nm) of the layer of liquid crystal) preferably is 300 to 3000 nm. In the bend orientation cell, Re (retardation) of $|\Delta n_1 \times d_1|$ generally is in the range of 700 to 2000 nm, preferably 800 to 1800 nm. In the HAN mode cell, Re (retardation) of $|\Delta n_1 \times d_1|$ generally is in the range of 350 to 1000 nm, preferably 400 to 900 nm.

Examples of the present invention and comparison examples are given below, but these examples by no means restrict the invention.

EXAMPLE (1) Preparation of bend orientation cell

On a glass plate provided with a ITO (Indium Tin Oxide) electrode, a polyimide layer was formed and the surface of the layer was subjected to rubbing treatment to form an orientation layer. Further, a glass substrate having orientation layer was prepared similarly. The two glass plates were faced each other such that the rubbing directions were parallel each other, and combined so as to have a gap between the plates of 10 μm. Nematic liquid crystal ($\Delta n_1$=0.1396; trade name: ZLI1132, available from Merck & Co., Inc.) was inserted into the gap, to prepare a liquid crystal cell (bend orientation cell).

The retardation of the liquid crystal layer ($Re_2$) was 1396 nm.

(2) Preparation of HAN mode cell

On a glass plate provided with a ITO electrode, a polyimide layer was formed and the surface of the layer was subjected to rubbing treatment to form an orientation layer. Separately, SiO was deposited on a glass plate provided with a ITO electrode to form an orientation layer (for. The two glass plates were faced each and combined so as to have a gap between the plates of 5 μm. Nematic liquid crystal ($\Delta n_1$=0.1396; trade name: ZLI1132, available from Merck & Co., Inc.) was inserted into the gap, to prepare a liquid crystal cell (HAN mode cell).

The retardation of the liquid crystal layer ($Re_2$) was 698 nm.

(3) Preparation of optical compensatory sheet (A)

On a triacetyl cellulose film having a thickness of 100 μm (available from Fuji Photo Film Co., Ltd.), a thin layer of gelatin (0.1 μm) was formed. A coating solution containing polyvinyl alcohol having acrylate groups and long chain alkyl group as terminal group (the following compound (1)) was coated on the gelatin layer, dried using warm air (80° C.) to form a layer of the polyvinyl alcohol and rubbing a surface of the layer to form an orientation layer.

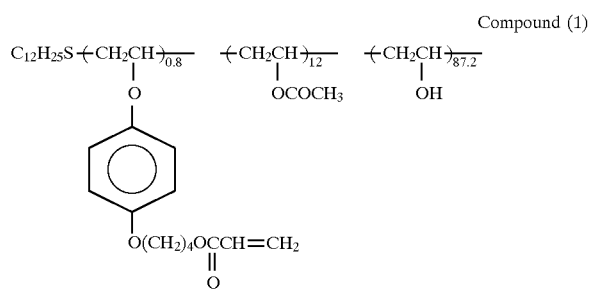

Compound (1)

"$|n_x-n_y| \times d_2$" and "$\{(n_x+n_y)/2-n_z\} \times d_2$" of the triacetyl cellulose film was determined, in which $n_x$ and $n_y$ is main refractictive indices within the film, $n_z$ is a main refractive index in a thickness direction, and $d_2$ is a thickness of the film. The thickness was measured with a micrometer, and Re values in various directions were measured by an ellipsometer (AEP-100, available from Shimadzu Seisakusho, Ltd.) to determine the above "$n_x-n_y \times d_2$" and "$\{(n_x+n_y)/2-n_z\} \times d_2$". "$|n_x-n_y| \times d_2$" was 5 nm and "$\{(n_x+n_y)/2-n_z\} \times d_2$" was 40 nm. Thus, the film had almost negative uniaxial property and the optic axis almost was coincident with the direction of the normal of the film.

On the orientation layer, a coating solution obtained by dissolving a mixture of 1.8 g of the discotic liquid crystalline compound TE-8-(8, m=4) (compound previously mentioned), 0.2 g of ethylene glycol modified-trimethylolpropane triacrylate (V#360, available from Osaka Organic Chemical Industry Co., Ltd.), 0.04 g of acetylbutyrylcellulose (CAB551-0.2, available from Eastman Chemical Co.), 0.06 g of photopolymerization initiator (Irgacure-907, available from Ciba-Geigy) and 0.02 g of sensitizer (Kayacure-DETX, available from Nippon Kayaku Co., Ltd.) in 3.43 g of methyl ethyl ketone was coated using a wire-bar coater (#3 bar). The coated film was fixed in a metal frame, and heated in a thermostat at a temperature of 120° C. for 3 minutes to orient the discotic liquid crystalline compound of the coated layer. Subsequently, UV light was irradiated on the coated layer under heating at 120° C. using a high-pressure mercury lamp (120 W/cm) for one minute and cooled to room temperature to form an optically anisotropic layer having a thickness of 1.0 μm. Thus, an optical compensatory sheet (A) was obtained.

Figure 11:
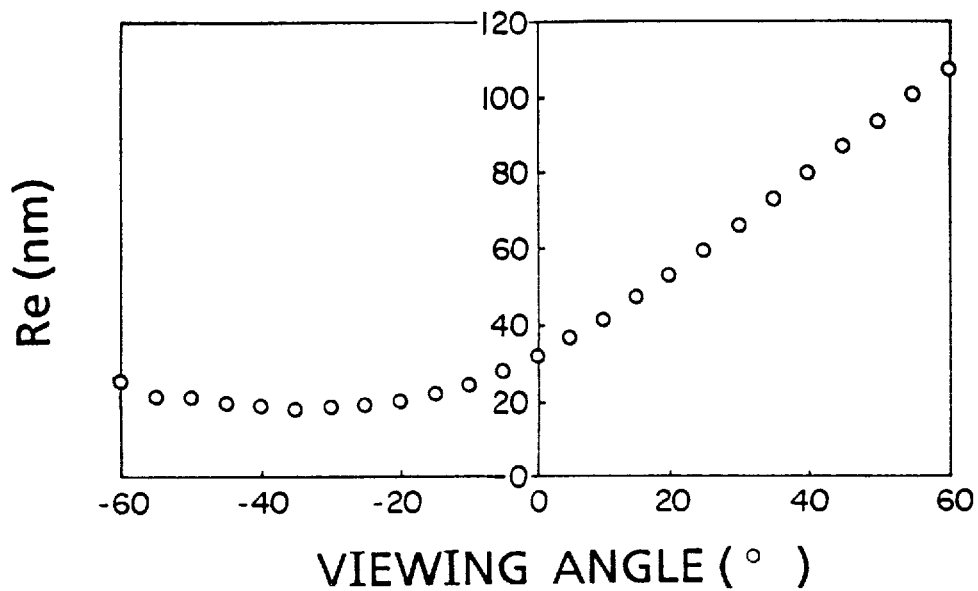
FIG. 11 is a graph the relationship of retardation and viewing angle of the optical compensatory sheet (A) in Example.

Retardations of the resultant optical compensatory sheet (A) were measured along the rubbing direction using an ellipsometer (AEP-100, available from Shimadzu Seisakusho, Ltd.). The results gave the relationship of Re (retardation and viewing angle (angle inclined from the normal of the sheet) as shown in FIG. 11. FIG. 11 indicates that the sheet has no direction showing Re of zero, and simulation based on the results gave that the direction of the minimum of absolute values of retardation values is inclined at 21 degrees (average value) from the normal of the sheet and retardation in the case is 117 nm.

Figure 12:
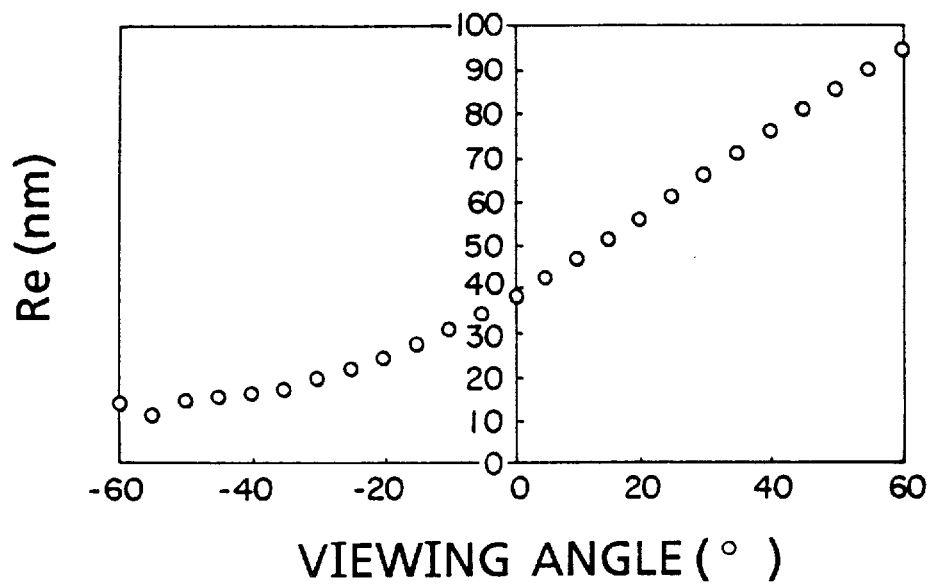
FIG. 12 is a graph the relationship of retardation and viewing angle of the optically anisotropic layer of the optical compensatory sheet (A) in Example.

Retardations of the optically anisotropic layer (discotic compound layer) of the optical compensatory sheet (A) were measured along the rubbing direction using an ellipsometer (AEP-100, available from Shimadzu Seisakusho, Ltd.). The results gave the relationship of Re (retardation) and viewing angle (angle inclined from the normal of the sheet) as shown in FIG. 12. FIG. 12 indicates that the sheet has no direction showing Re of zero, and simulation based on the results gave that the discotic planes of the discotic compound show hybrid alignment in which angles of the planes to the transparent support continuously increases from 4 to 68 degrees with increase of distance in the direction of depth from the bottom of the optically anisotropic layer (i.e., the angles of the directors of negative monoaxis to the normal of the transparent support continuously increases from 4 to 68 degrees with increase of the distance).

The retardation of the optical compensatory sheet ($Re_1$) was 314 nm {(40+117 nm)×2} in the bend orientation type, and 157 nm (40+117 nm) in the HAN mode type.

(4) Preparation of optical compensatory sheet (B)

The procedure for preparation of optical compensatory sheet (A) was repeated except for using the following polycarbonate film instead of the TAC film, and using #10 bar coater instead of #3 bar coater so as to form an optically anisotropic layer of 5.0 μm (thickness), to prepare an optical compensatory sheet (B).

Polycarbonate film

Polycarbonate prepared by polycondensation of phosgene and bisphenol A (weight average molecular weight: 120,000) was dissolved in dichloromethane to prepare a solution (polycarbonate of 18 weight %). The solution was casted on a steel drum under revolution, continuously peeled from the drum, and then the peeled film was dried with diaxially stretching to form a polycarbonate film having a thickness of 60 μm.

As for the polycarbonate film, Re values in various directions were measured by an ellipsometer (AEP-100, available from Shimadzu Seisakusho, Ltd.) to determine the refractive indecies. The results were as follows: $n_x$=1.540, $n_y$=1.540, $n_z$=1.536; in which $n_x$ and $n_y$ is main refractive indices within the film, $n_z$ is a main refractive index in a thickness direction. Further, the thickness ($d_2$) was measured with a micrometer, and the above "$|n_x-n_y| \times d_2$" and "$\{(n_x+n_y)/2-n_z\} \times d_2$" were determined. "$|n_x-n_y| \times d_2$" was 0 nm, "$\{(n_x+n_y)/2-n_z\} \times d_2$" was 240 nm and $\Delta n_2$(450 nm)/$\Delta n_2$(600 nm) was 1.1 ($\Delta n_2$ is birefringence of the film).

Retardations of the optically anisotropic layer (discotic compound layer) of the optical compensatory sheet (B) were measured along the rubbing direction using an ellipsometer (AEP-100, available from Shimadzu Seisakusho, Ltd.). The results indicated that the sheet had no direction showing Re of zero, and simulation based on the results gave that the doscotic planes of the discotic compound showed hybrid alignment in which angles of the planes to the transparent support continuously increase from 4 to 68 degrees with increase of distance in the direction of depth from the bottom of the optically anisotropic layer (i.e., the angles of the directors of negative monoaxis to the normal of the transparent support continuously increase from 4 to 68 degrees with increase of the distance). Further, the direction of the minimum of absolute values of retardation values was inclined at 36 degrees (average value) from the normal of the sheet and retardation $\Delta n_3 \cdot d_3$ of the optically anisotropic layer in the case was 160 nm ($\Delta n_3$: birefringence of the layer, $d_3$: thickness of the layer).

The resultant optical compensatory sheet (B) was cut in the rubbing direction along depth of the sheet using a microtome to prepare an extremely thin film (sample). The sample was allowed to stand in an atmosphere of $OsO_4$ for 48 hours to dye. The dyed sample was observed by a transmission electron microscope (TEM) and a photograph of the dyed sample was taken. In the dyed sample, acryloyl groups of the discotic liquid crystalline compound TE-8-(8, m=4) of the optically anisotropic layer was dyed and the acryloyl groups came out on the photo.

From the photo, it was confirmed that the discotic liquid crystalline compound of the optically anisotropic layer was inclined from the transparent support, while the inclined angle continuously increased degrees with increase of distance in the direction of depth from the bottom of the optically anisotropic layer.

The retardation of the optical compensatory sheet ($Re_1$) was 800 nm {(240+160 nm)×2} in the bend orientation type (5) Preparation of optical compensatory sheet (C)

Polycarbonate prepared by polycondensation of phosgene and bisphenol A (weight average molecular weight: 120,000) was dissolved in dichloromethane to prepare a solution (polycarbonate of 18 weight %). The solution was casted on a steel drum under revolution, continuously peeled from the drum, and then the peeled film was dried with stretching in diaxial directions of different stretching forces each other (unbalanced stretching) to form a polycarbonate film having a thickness of 60 μm.

As for the polycarbonate film, Re values in various directions were measured by an ellipsometer (AEP-100, available from Shimadzu Seisakusho, Ltd.) to determine the refractive indecies. The results were as follows: $n_x$=1.546, $n_y$=1.540, $n_z$=1.533; in which $n_x$ and $n_y$ is main refractive indices within the film, $n_z$ is a main refractive index in a thickness direction.

(6) Preparation of optical compensatory sheet (D)

The procedure for preparation of optical compensatory sheet (C) was repeated except for changing the stretching ratio in the unbalanced stretching to prepare a polycarbonate film having a thickness of 50 μm as an optical compensatory sheet (D).

As for the polycarbonate film, Re values in various directions were measured by an ellipsometer (AEP-100, available from Shimadzu Seisakusho, Ltd.) to determine the refractive indecies. The results are as follows: $n_x$=1.544, $n_y$=1.540, $n_z$=1.536; in which $n_x$ and $n_y$ is main refractive indices within the film, $n_z$ is a main refractive index in a thickness direction.

EXAMPLE 1

Preparation of liquid crystal display (bend orientation type)

The optical compensatory sheet (A) was disposed on each side of the bend orientation cell obtained above (1) such that the optically anisotropic layer of the sheet was faced to the cell and the rubbing direction of the substrate of the cell was parallel to that of the sheet faced to the substrate. Further, a polarizing plate was arranged on each of the two optical compensatory sheets in such a manner that the two polarizing axes intersected at right angles (i.e., cross-nicole). These were combined to prepare a liquid crystal display.

The obtained liquid crystal display is normally white mode type and has a structure shown in FIG. 9.

[Evaluation of liquid crystal display]

To the LCD, a rectangular wave of 55 Hz was applied at voltages of 2.5 V to 6 V (2.5 V: white display; 6 V: black display) according to a normally white mode. Transmittances (T) were measured by varying the viewing angle using a spectrophotometer (LCD-5000, available from Otsuka Electronics Co., Ltd.). From the measured data, the angle against the normal at which the contrast ($T_{2.5V}/T_{6V}$) on a black-and-white display showed values of not less than 10 was defined as viewing angle, and the viewing angles in a height (upper-lower) direction and a width (left-right) direction of the LCD were determined.

The obtained result is set forth in Table 1.

EXAMPLE 2

Preparation of liquid crystal display (bend orientation type

The procedure of Example 1 was repeated except for using the optical compensatory sheet (B) as an optical compensatory to prepare a liquid crystal display (bend orientation mode).

Evaluation of the liquid crystal display was also conducted in the same manner as in Example 1.

The obtained result is set forth in Table 1.

COMPARISON EXAMPLE 1
Preparation of liquid crystal display (bend orientation type)

The optical compensatory sheet (C) was disposed on viewing side of the bend orientation cell obtained above (1) such that the direction of $n_y$ of the sheet is parallel to the rubbing direction of the cell. Further, a polarizing plate was arranged on each side of the cell through the optical compensatory sheet in such a manner that the two polarizing axes intersected at right angles. These were combined to prepare a liquid crystal display.

The obtained liquid crystal display is normally black mode type.

[Evaluation of liquid crystal display]

To the LCD, a rectangular wave of 55 Hz was applied at voltages of 2.5 V to 6 V (2.5 V: black display; 6 V: white display) according to a normally black mode. Transmittances (T) were measured by varying the viewing angle using a spectrophotometer (LCD-5000, available from Otsuka Electronics Co., Ltd.). From the measured data, the angle against the normal at which the contrast ($T_{6V}/T_{2.5V}$) on a black-and-white display showed values of not less than 10 was defined as viewing angle and the viewing angles in a height (upper-lower) direction and a width (left-right) direction of the LCD were determined.

The obtained result is set forth in Table 1.

TABLE 1

| | | | Viewing Angle | |
|---|---|---|---|---|
| Example | Sheet No. | Contrast from Front side | upper-lower (degree) | left-right (degree) |
| Ex. 1 | (A) | ≧100 | ≧120 | ≧120 |
| Ex. 2 | (B) | ≧100 | ≧120 | 120 |
| Co. Ex. 1 | (C) | ≧100 | 68 | 76 |

As is apparent from results of Table 1, the liquid crystal displays (Examples 1–2) provided with the optical compensatory sheets having increasing inclined angle of the plane of the discotic liquid crystalline compound showed greatly enlarged viewing angle and high contrast from front side.

EXAMPLE 3
Preparation of liquid crystal display (HAN mode type)

The optical compensatory sheet (A) was disposed on viewing side of the HAN mode cell obtained above (2) such that the optically anisotropic layer of the sheet is faced to the cell and the rubbing direction of the sheet is parallel to that of the substrate of the cell. Further, a polarizing plate was arranged on the optical compensatory sheet in such a manner that the transmitting axis of the polarizing sheet intersected at 45 degrees to the rubbing direction of the cell, and a diffusion plate was disposed on the polarizing plate. Furthermore, a mirror was disposed on the side having no sheet of the cell. These elements were combined to prepare a reflective type liquid crystal display.

The obtained liquid crystal display is normally white mode type and has a structure shown in FIG. 10.

[Evaluation of liquid crystal display]

A light source was arranged in the direction inclined at 20 degrees from the normal of the LCD, and light ray from the light source was radiated on the LCD. To the LCD, a rectangular wave of 55 Hz was applied at voltages of 2.5 V to 6 V (2.5 V: white display; 6 V: black display) according to a normally white mode. Transmittances (T) were measured by varying the viewing angle using a spectrophotometer (bm-7, available from Topcon Co., Ltd.). From the measured data, the angle against the normal at which the contrast ($T_{2.5V}/T_{6V}$) on a black-and-white display showed values of not less than 10 was defined as viewing angle and the viewing angles in a height (upper-lower) direction and a width (left-right) direction of the LCD were determined.

The obtained result is set forth in Table 2.

COMPARISON EXAMPLE 2
Preparation of liquid crystal display (HAN mode type)

The optical compensatory sheet (D) was disposed on viewing side of the HAN mode cell obtained above (2) such that the direction of $n_y$ of the sheet is parallel to the rubbing direction of the cell. Further, a polarizing plate was arranged on the optical compensatory sheet in such a manner that the transmitting axis of the polarizing sheet intersected at 45 degrees to the rubbing direction of the substrate of the cell. Furthermore, a diffusion plate (TiO$_2$ containing plate) was disposed on the polarizing plate, and a mirror was disposed on the side having no sheet of the cell. These elements were combined to prepare a reflective type liquid crystal display.

The obtained liquid crystal display is normally black mode type.

[Evaluation of liquid crystal display]

A light source was arranged in the direction inclined at 20 degrees from the normal of the LCD, and light ray from the light source was radiated on the LCD. To the LCD, a rectangular wave of 55 Hz was applied at voltages of 2.5 V to 6 V (2.5 V: black display; 6 V: white display) according to a normally black mode. Transmittances (T) were measured by varying the viewing angle using a spectrophotometer (bm-7, available from Topcon Co., Ltd.). From the measured data, the angle against the normal at which the contrast ($T_{6V}/T_{2.5V}$) on a black-and-white display showed values of not less than 10 was defined as viewing angle and the viewing angles in a height (upper-lower) direction and a width (left-right) direction of the LCD were determined.

The obtained result is set forth in Table 2.

TABLE 2

| | | | Viewing Angle | |
|---|---|---|---|---|
| Example | Sheet No. | Contrast from Front side | upper-lower (degree) | left-right (degree) |
| Ex. 3 | (A) | 30 | 64 | 73 |
| Co. Ex. 2 | (D) | 25 | 45 | 52 |

As is apparent from results of Table 2, the liquid crystal display (Example 3) provided with the optical compensatory sheets having increasing inclined angle of the plane of the discotic liquid crystalline compound showed greatly enlarged viewing angle and high contrast from front side.

What is claimed is:

1. A liquid crystal display comprising a liquid crystal cell which comprises a pair of substrates each of which is provided with a transparent electrode having an orientation layer thereon and a layer of nematic liquid crystal sealed therebetween, two polarizing sheets arranged on each side of the cell, and two optical compensatory sheets arranged between the liquid crystal cell and the polarizing sheets, the layer of nematic liquid crystal showing a bend orientation, the nematic liquid crystal varying its angle of director to the plane of the substance under variation of voltage applied to the liquid crystal cell;

wherein each of the optical compensatory sheets shows the minimum of absolute values of retardation values in a direction inclined from the normal of the sheet, and wherein the two optical compensatory sheets satisfy the condition:

$$0.2 \times Re_2 \leq Re_1 \leq 2.0 \times Re_2$$

wherein $Re_1$ represents an absolute value of a sum of retardation values of the two optical compensatory sheets, and $Re_2$ represents an absolute value of a retardation value of the layer of nematic liquid crystal of the liquid crystal cell;

the retardation value of optical compensatory sheet being defined by the formula:

$$\{(n_2+n_3)/2-n_1\} \times d$$

in which $n_1$, $n_2$ and $n_3$ are refractive indices in the three axis directions of the optical compensatory sheet $n_1$, $n_2$ and $n_3$ satisfy the condition of $n_1 \leq n_2 \leq n_3$, and d is the thickness in terms of nm of the optical compensatory sheet;

the retardation value of the layer of nematic liquid crystal being defined by the formula:

$$\{n_3-(n_1+n_2)/2\} \times d$$

in which $n_1$, $n_2$ and $n_3$ are refractive indices in the three axis directions of the layer of nematic liquid crystal, $n_1$, $n_2$ and $n_3$ satisfy the condition of $n_1 \leq n_2 \leq n_3$, and d is the thickness in terms of nm of the layer of nematic liquid crystal.

2. The liquid crystal display as defined in claim 1, wherein each of the two optical compensatory sheets comprises a transparent support and an optically anisotropic layer provided thereon, the optically anisotropic layer comprising a compound having one or more discotic structure units in its molecule.

3. The liquid crystal display as defined in claim 2, wherein the discotic structure units have planes inclined from a plane of the transparent support at angles varying in the direction of depth of the optically anisotropic layer.

4. The liquid crystal display as defined in claim 2, wherein the transparent support has an optic axis in the direction of the normal of the support, and satisfies the condition of:

$$20 \leq \{(n_x+n_y)/2-n_z\} \times d_2 \leq 400$$

in which $n_x$ and $n_y$ are main refractive indices within the film, $n_z$ is a main refractive index in the thickness direction of the film, and $d_2$ is the thickness in terms of nm of the support.

5. The liquid crystal display as defined in claim 2, wherein the transparent support has an orientation layer thereon.

6. The liquid crystal display as defined in claim 1, which is driven in a normally white mode.

7. A liquid crystal display comprising a liquid crystal cell which comprises a pair of substrates each of which is provided with a transparent electrode having an orientation layer thereon and a layer of nematic liquid crystal sealed therebetween, the orientation layer of one of the substrates being a layer capable of giving homeotropic structure to the nematic liquid crystal, a polarizing sheet arranged on one side of the cell, the other side of the cell being provided with a reflective plate, and an optical compensatory sheet provided between the liquid crystal cell and the polarizing sheet, the layer of nematic liquid crystal showing hybrid alignment, the nematic liquid crystal varying its angle of director to the plane of the substrate under variation of voltage applied to the liquid crystal cell;

wherein the optical compensatory sheet shows the minimum of absolute values of retardation values in a direction inclined from the normal of the sheet, and wherein the optical compensatory sheet further satisfies the condition:

$$0.2 \times Re_2 \leq Re_1 \leq 2.0 \times Re_2$$

wherein $Re_1$ represents an absolute value of a retardation value of the optical compensatory sheet, and $Re_2$ represents an absolute value of a retardation value of the layer of nematic liquid crystal of the liquid crystal cell;

the retardation value of optical compensatory sheet being defined by the formula:

$$\{(n_2+n_3)/2-n_1\} \times d$$

in which $n_1$, $n_2$ and $n_3$ are refractive indices in the three axis directions of the optical compensatory sheet, $n_1$, $n_2$ and $n_3$ satisfy the condition of $n_1 \leq n_2 \leq n_3$, and d is the thickness in terms of nm of the optical compensatory sheet;

the retardation value of the layer of nematic liquid crystal being defined by the formula:

$$\{n_3-(n_1+n_2)/2\} \times d$$

in which $n_1$, $n_2$ and $n_3$ are refractive indices in the three axis directions of the layer of nematic liquid crystal, $n_1$, $n_2$ and $n_3$ satisfy the condition of $n_1 \leq n_2 \leq n_3$, and d is the thickness in terms of nm of the layer of nematic liquid crystal.

8. The liquid crystal display as defined in claim 7, wherein the optical compensatory sheet comprises a transparent support and an optically anisotropic layer provided thereon, the optically anisotropic layer comprising a compound having one or more discotic structure units in its molecule.

9. The liquid crystal display as defined in claim 8, wherein the discotic structure units have planes inclined from a plane of the transparent support at angles varying in the direction of depth of the optically anisotropic layer.

10. The liquid crystal display as defined in claim 8, wherein the transparent support has an optic axis in a direction of the normal of the support, and satisfies the condition of:

$$20 \leq \{(n_x+n_y)/2-n_z\} \times d_2 \leq 400$$

in which $n_x$ and $n_y$ are main refractive indices within the film, $n_z$ is a main refractive index in the thickness direction of the film, and $d_2$ is the thickness in terms of nm of the support.

11. The liquid crystal display as defined in claim 8, wherein the transparent support has an orientation layer thereon.

12. The liquid crystal display as defined in claim 7, which is driven in a normally white mode.

* * * * *